United States Patent [19]

Gutjahr

[11] Patent Number: 4,605,367
[45] Date of Patent: Aug. 12, 1986

[54] MOLD CLOSING UNIT OF AN INJECTION MOLDING MACHINE

[75] Inventor: Lothar Gutjahr, Denzlingen, Fed. Rep. of Germany

[73] Assignee: Klöckner-Werke Aktiengesellschaft, Duisburg, Fed. Rep. of Germany

[21] Appl. No.: 636,722

[22] Filed: Aug. 1, 1984

[30] Foreign Application Priority Data

Aug. 3, 1983 [DE] Fed. Rep. of Germany ....... 3327936

[51] Int. Cl.⁴ ............................................. B29C 45/68
[52] U.S. Cl. ................................. 425/150; 264/40.5; 425/451.2; 425/590; 425/DIG. 223
[58] Field of Search ............... 425/150, 450.1, 451.2, 425/451.5, 451.7, 451.3, 589, 590, 592, DIG. 223, 135, 149; 264/40.5; 91/35, 380

[56] References Cited

U.S. PATENT DOCUMENTS

| | | | |
|---|---|---|---|
| 3,564,659 | 2/1971 | Koch et al. | 425/149 |
| 3,677,685 | 7/1972 | Aoki | 425/450.1 |
| 3,797,364 | 3/1974 | Schulze | 91/35 |
| 3,825,235 | 7/1974 | Schwertfeger et al. | 425/145 |
| 3,857,658 | 12/1974 | Muzsnay | 425/145 |
| 3,940,930 | 3/1976 | Rosander | 425/450.1 |
| 3,941,534 | 3/1976 | Hunkar | 425/145 |
| 4,009,983 | 3/1977 | Jacobs | 425/451.2 |
| 4,253,358 | 3/1981 | Schulze | 82/5 |
| 4,540,359 | 9/1985 | Yamazaki | 425/135 |

FOREIGN PATENT DOCUMENTS 2112701 9/1972 Fed. Rep. of Germany ... 425/451.2
56-99644 8/1981 Japan.

OTHER PUBLICATIONS

Hartmann and Laemmle KG, entitled "Electro-Hydraulic Linear Amplifiers LVS, 10th Edition 1977.

Primary Examiner—Jay H. Woo
Assistant Examiner—J. Fortenberry
Attorney, Agent, or Firm—Watson, Cole, Grindle & Watson

[57] ABSTRACT

A mold closing unit of an injection molding machine has a hydraulic traveling cylinder and a hydraulic mold closure retention cylinder for the movable mold clamping plate. One-half of a divided injection mold is clamped on the plate and defines with a fixed mold die a mold cavity having a larger volume at the commencement of the mold charge than at the termination of the mold charge. A threaded spindle is engaged with the movable mold clamping plate through a spindle nut, and the spindle is freely rotatable in the stationary mold clamping plate and is connected with a stepping motor. A 4/2-way valve is arranged in the hydraulic supply line leading to the traveling cylinder, and its valve body is axially shiftable on the spindle. The stepping motor is controlled depending on a specified pressure and/or speed pattern as a function of the distance between the mold halves or the mold clamping plates.

1 Claim, 1 Drawing Figure

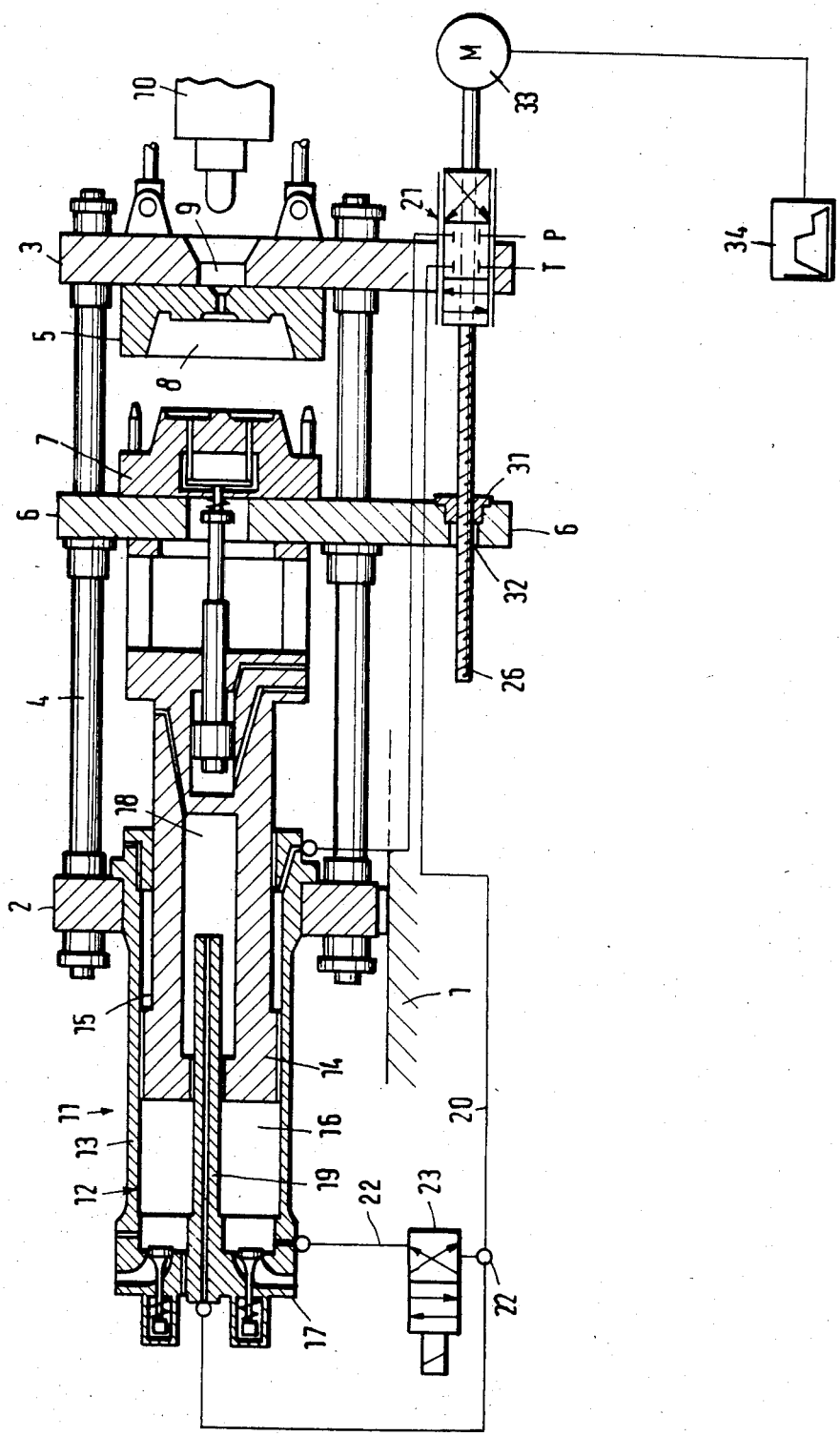

MOLD CLOSING UNIT OF AN INJECTION MOLDING MACHINE

RELATED APPLICATIONS

This application relates to U.S. Ser. No. 463,112, filed Feb. 2, 1983, and further relates to U.S. Ser. Nos. 630,715 and, 636,723 filed concurrently herewith based on West German application Nos. P 33 27 935.7-6 and P 33 27 937.3-16, both filed Aug. 3, 1983.

BACKGROUND OF THE INVENTION

This invention relates to a mold closing unit of an injection molding machine which includes a stationary mold clamping plate and a movable mold clamping plate slidable along parallel guide rods relative to the stationary plate, movable and fixed mold dies respectively affixed to the movable and stationary plates so as to define therebetween a mold nest or cavity having a volume which is greater at the commencement of mold charging than at the termination of the mold charging. And, the mold closing unit includes a fixed, hydraulic mold closure retention cylinder, and a hydraulic traveling cylinder including a piston operable within the retention cylinder to define a pressure chamber therewith, the piston being connected to the movable die.

In known mold closing units of this general type, the volume of the mold nest or cavity is greater while the plasticized material is injected than during the subsequent pressure phase. The quality of the produced molded part is thereby considerably increased by employing this approach.

However, problems arise particularly because the specific type of enlarged volume of the mold cavity requires that the movable half of the mold die must have an exactly defined position relative to the stationary half of the mold. These difficulties have been overcome only partially but with an increasingly complex hydraulic control system. Thus, changes in length of the guide rods must be taken into consideration, for example, which are dependent upon the operating temperature, since this has an affect on the distance between the movable half of the mold in its intermediate position and the stationary half of the mold. Furthermore, a pressure is built up in the mold during injection of the plasticized material which is counteracted by means of the mold closure retention pressure which is exerted by the mold closure retention cylinder. Problems arise particularly because the viscosity of the hydraulic medium changes with changing operating temperatures which thereby influences the compressibility of the hydraulic operating medium. Moreover, it is difficult in practice to maintain the hydraulic operating medium free of air pockets, i.e. generally free of gases, which result in the formation of gas bubbles in the hydraulic operating medium during higher operating temperatures, which also exert a considerable influence on maintaining the movable half of the mold in its intermediate position. However, prior solutions to these problems require that the movable mold clamping plate be maintained in its intermediate position by the pressure of the traveling cylinder and/or the mold closure retention cylinder, although such approach has proven unsatisfactory for the reasons noted above.

SUMMARY OF THE INVENTION

It is therefore an object of the present invention to provide a mold closing unit of an injection molding machine such that the approach of the intermediate position of the movable mold clamping plate is independent of changes in length of the guide rods along which the movable mold clamping plate slides, is independent of the influences of the operating temperature on the hydraulic operating medium, etc., and to provide the mold closing unit as having a considerably higher accuracy at the positioning of the movable mold clamping plate with the simultaneous availability of the partial or full mold closing force.

This general objective is achieved according to the invention in that an elongated threaded rotatable spindle extends between the mold clamping plates, threadedly engages the movable mold clamping plate via a spindle nut, and extends through the stationary mold clamping plate in a freely rotatable manner, a stepping motor being connected with the spindle for rotation thereof, and a 4/2-way valve being arranged in a hydraulic supply passage leading to the traveling cylinder for expanding and retracting the piston relative to the retention cylinder, the valve having a valve body in engagement with the spindle for axial movement therewith, the stepping motor being controllable depending on a specified speed and/or pressure pattern as a function of the distance between the movable and fixed dies or between the mold clamping plates, the hydraulic supply passage having a branch hydraulic supply line leading to the pressure chamber between the piston and cylinder, and a multi-way valve in the branch line. With such an arrangement, pressure applied by the hydraulic operating medium to the pressure chamber and to the traveling cylinder for extending the piston during mold closing counteracts the mold charging pressure while the mold is partially open with a counter-force up to the full closure retention force.

Thus, according to the invention, it is assured that the intermediate position of the movable mold clamping plate is independent of any changes in length of the guide rods along which the plate slides, and is independent of the pressure of the hydraulic operating medium so that the movable mold clamping plate can be operated precisely into its intermediate position even during highly fluctuating operating temperatures. In such instance, the stepping motor is controlled depending on a specified speed and/or pattern as a function of the distance between the mold halves or the mold clamping plates. As a result the stepping motor rotates the spindle whereby, at the same time, the valve body of the 4/2-way valve is shifted accordingly and opens an essentially large cross-section for the passage of the hydraulic operating medium to the traveling cylinder or to the mold closure retention cylinder so that the traveling cylinder or mold closure retention cylinder is correspondingly acted upon and the movable mold clamping plate is correspondingly moved. This results in a corresponding oppositely directed movement of the valve body which is again counteracted by the stepping motor in accordance with the specified pressure and/or speed pattern. In such manner, a hydraulically back-coupled rigid control circuit is provided with the result that the movement of the movable mold clamping plate and thus of the movable half of the mold is controlled with optimal accuracy depending essentially on the accuracy of the spindle and of the resolution of the stepping motor.

Hydraulic components operating under this principle of hydraulically rigid back-coupling are disclosed in a publication of Hartmann and Laemmle KG, entitled "Electro-Hydraulic Linear Amplifier LVS, 10th edition 1977". However, such components have only been used to precisely position machine parts which are movable on machine tools, for example. And, those skilled in the art have never considered integrating this principle into mold closing units for injection molding machines for the purpose of reducing the hydraulic control complexity which presently prevails, and for avoiding the above-noted drawbacks.

BRIEF DESCRIPTION OF THE DRAWING

The single drawing FIGURE is a longitudinal sectional view of an injection molding machine incorporating the mold closing unit according to the invention.

DETAILED DESCRIPTION OF THE INVENTION

The injection molding machine includes a support bed 1 on which a pair of spaced, parallel support plates 2 and 3 are fixedly mounted and are interconnected by a plurality of guide rods 4 lying parallel to the central axis of the plates. Support plate 3 defines a stationary mold clamping plate on which one-half 5 of a divided injection mold is clamped, while the other half 7 of the mold is clamped on a movable mold clamping plate 6 mounted for sliding movement along the guide rods. In the intermediate position, the two halves of a mold define a mold cavity or nest 8 in a known manner into which plastic material is injected through a sprue hole 9 by a conventional injection unit 10. A mold closing unit, generally designated 11, extends outwardly from one side of the movable mold clamping plate. The mold closing unit comprises a mold closure retention cylinder, generally designated 12, including a cylinder 13 affixed at one end to support plate 2. A piston 14, operable within cylinder 13, has first and second pressure chambers 15 and 16 on opposite sides by means of which the piston is respectively retracted and extended relative to cylinder 13. The piston rod of the piston is connected to the movable mold clamping plate. And, the piston is hollow so as to define a third pressure chamber 18 into which a hollow tube 19 extends in a telescoping manner. Tube 19 is rigidly secured to a front plate 17 of cylinder 13 and has a connection for a pressure line 20 connected to a 4/2-way valve 21 through which a hydraulic operating medium can be supplied and discharged. Piston 14, its piston rod and tube 19 define a traveling cylinder in which chamber 18, when pressurized, effects extension of the piston outwardly of cylinder 13, and chamber 15, when pressurized, effects retraction of the piston inwardly of its cylinder. Pressure chamber 15 is connected to supply line 20 which leads to valve 21.

The hydraulic supply line has a branch hydraulic supply line 22 interconnecting chamber 16 and the 4/2-way valve via supply line 20. Another multi-way valve 23 is arranged in branch line 22 which leads into pressure chamber 16 of the mold closing cylinder.

An elongated, threaded, rotatable spindle 26, preferably coarse threaded, engages movable mold clamping plate 6 which has a spindle nut 31 thereon through which the spindle extends, the spindle nut being seated in a bore 32 of plate 6. The spindle is freely rotatable in stationary mold clamping plate 3, and a stepping motor 33 is connected with the spindle for rotation thereof. Valve 21 has a valve body in engagement with the spindle for axial movement therewith. The stepping motor is controlled according to a specified program depending on the speed and/or the pressure pattern as a function of the distance between the mold halves or between the mold clamping plates. The values are stored by a memory 34 depending on the path covered by the movable mold clamping plate. During a closing of the injection mold and after the movable mold clamping plate has reached a predetermined distance relative to the stationary mold clamping plate, this position is maintained and the specified quantity of plastic material is injected into the initially enlarged volume of the mold cavity during a specified period of time. Subsequently, the movable mold clamping plate is moved to its final position while the mold closure retention pressure is applied at the same time. Owing to the designed rigid hydraulic back-coupling and the extreme accuracy of the stepping motor, it is assured that the intermediate position of the movable half of the mold is reached and this half is, subsequently, moved precisely to its final position independent of any changes in length of the guide rods, temperature fluctuations or viscosity changes of the hydraulic operating medium. And, multi-way valve 23 permits a high holding force to be attained during this position controlled by the action of pressure up to the maximum mold closure retention force.

The mold closing unit according to the invention can be employed for injection molding operations as well as for injection stamping, i.e. for the processing of thermosetting plastics or of thermoplastics and elastomers.

Obviously, many modifications and variations of the present invention are made possible in the light of the above teachings. It is therefore to be understood that within the scope of the appended claim the invention may be practiced otherwise than as specifically described.

What is claimed is:

1. A mold closing unit of an injection molding machine which includes a stationary mold clamping plate and a movable mold clamping plate slidable along parallel guide rods relative to said stationary plate, a movable mold die affixed to said movable plate a mating fixed mold die affixed to said stationary plate and confronting said movable die so as to therewith define a mold cavity having a volume which is greater at the commencement of mold charging than at the termination of the mold charging, the unit comprising a fixed, hydraulic mold closure retention cylinder, and a hydraulic traveling cylinder including a piston operable within said retention cylinder and defining therewith on opposite sides of said piston first and second pressure chambers for respectively retracting and extending said piston, said piston being connected to said movable die, and said piston being hollow so as to define a third pressure chamber, means for operating said unit comprising a hydraulic supply passage leading to said first and third chambers for operating said piston; a linear amplifier having rigid hydraulically fixed feedback and comprising a 4/2-way valve arranged in said supply passage for axial movement to control the flow of hydraulic fluid through said passage for closing and opening said movable die, and elongated threaded rotatable spindle extending between said mold clamping plates, a spindle nut on said movable plate through which said spindle extends for threadedly engaging said spindle with said movable plate, a stepping motor connected with said spindle for rotation thereof, said valve having a valve body on said spindle for axial movement upon spindle rotation, said stepping motor being controllable depending on one of a specified speed and pressure pattern as a function of the distance between said movable fixed dies or between said mold clamping plates, whereby rotation of said spindle effects the movement of said 4/2-way valve to control the flow of hydraulic fluid, the movement of said movable die effecting an oppositely directed movement of said valve via said spindle which is counteracted by said motor, said hydraulic supply passage having a branch hydraulic supply line leading to said second pressure chamber, a multi-way valve in said branch line for opening the flow of hydraulic fluid through said branch line into said second chamber at a predetermined distance of said movable plate from said stationary plate until said movable die plate closes, whereby said multi-way valve permits a high holding force to be attained at said distance.

* * * * *